United States Patent Office 2,905,657
Patented Sept. 22, 1959

2,905,657

POLYETHYLENE TEREPHTHALATES MODIFIED WITH CHAIN-TERMINATING COMPOUNDS AND PROCESS THEREFOR

William A. H. Huffman, Decatur, Ala., assignor to The Chemstrand Corporation, Decatur, Ala., a corporation of Delaware No Drawing. Application December 16, 1955
Serial No. 553,433

10 Claims. (Cl. 260—75)

This invention relates to new and valuable fiber-forming compositions comprising linear polymers of terepthalic acid and a polymethylene glycol. More specifically the invention relates to modified polymeric ethylene terephthalate polymers capable of being dyed by conventional procedures especially with dispersed acetate dyestuffs.

It is well known that the polymeric polyesters prepared by the condensation of a dihydric alcohol or its functional derivatives and a dibasic carboxylic acid or a polyester-forming derivative thereof, such as an acid halide, a salt, or a simple ester of a dibasic acid and a volatile monohydric alcohol are excellent fiber-forming polymers. Commercially the most important of the highly polymeric polyesters is that prepared by the condensation of terephthalic acid or dimethyl terephthalate and a polymethylene glycol containing from two to ten carbon atoms, and particularly ethylene glycol. These polyesters are relatively insoluble, chemically inactive, hydrophobic materials capable of being formed into filaments which can be cold-drawn to produce textile fibers of superior strength and pliability. However, since these materials are not readily permeable to water, they cannot be satisfactorily dyed by the ordinary dyeing procedures used in dyeing cotton, wool, natural silk and regenerated cellulose.

It is known that a slight amount of coloration to secure light shades may be obtained by dyeing polyethylene terephthalate at atmospheric pressure and 100° C. However, this occurs only with one group of dyestuffs, namely the water-insoluble anthraquinone and azo dyes which are more commonly known as dispersed acetate dyes. Unless a fiber-forming polyester can be readily dyed on commercial dyeing equipment, the utility of the polymer in the textile field is extremely limited.

The compact structure of polyethylene terephthalate fibers, for example, the molecules of which are closely packed along the axis of the fibers, makes it quite difficult, except with a limited number of dyes, to obtain a high degree of dyebath exhaustion or to secure satisfactorily deep shades. Absorption and penetration of the dye into the fiber core are limited by the inherent properties of the fiber.

A number of methods have been proposed to increase the dyeability of the polyesters and particularly polyethylene terephthalate. However, these methods have not proved to be entirely satisfactory. One known method of building dyeability with acid dyestuffs into a non-dyeable fiber is that of incorporating basic nitrogen in the polymer. However, in the case of polyethylene terephthalate, attempts to copolymerize ethylene glycol and a terephthalic acid derivative with a glycol or dibasic acid containing an amine group did not produce satisfactory fiber-forming materials. When glycols and dibasic acids containing primary and secondary amino groups are employed, cross-linked polymers are generally obtained which are not suitable for use in the manufacture of fibers, filaments, and the like. Further, attempts to form copolymers from glycols and dibasic acids containing a tertiary amine by the usual known methods have resulted in low-molecular weight polymers which in addition to being dark in color, were not suitable for filament and fiber formation. Accordingly, the art has desired some other means to increase the dyeability of polyester structures, such as fibers, filaments, films, and the like.

The purpose of this invention is to provide new and valuable general purpose fibers. A further purpose of the invention is to provide modified polyethylene terephthalate polymers which are dye-receptive in conventional dyeing procedures. A still further purpose of the invention is to provide a convenient means for modifying difficulty dyeable polyethylene terephthalate and converting it into polymers with excellent dye receptivity without depreciating the properties of the fibers produced therefrom. Other objects will become apparent from the description hereinafter.

It has now been found that modified polyethylene terephthalate polymers containing in the polymer molecule a minor proportion of compounds which function as chain-terminating groups are much more readily dyeable to deeper and more uniform colors particularly by the dispersed acetate dyestuffs, than the unmodified polyethylene terephthalate.

Compounds which have been found to function as chain-terminators for polyethylene terephthalate polymers may be generally described as monohydroxyl compounds. For use in the present invention the preferred monohydroxyl compounds are those selected from the group consisting of monohydric polyalkylene oxides and polyalkylvinyl ethers. The monohydrate polyalkylene oxides suitable for use in this invention are those having the general formula:

$$R\text{—}O[(CH_2)_mO]_x(CH_2)_n\text{—}OH$$

wherein R is selected from the group consisting of alkyl groups containing from one to 18 carbon atoms and aryl groups containing from six to ten carbon atoms, $m$ and $n$ are integers from 1 to 22, and $x$ is a whole number indicative of the degree of polymerization, $x$ may be an integer from 1 to 100 or greater. The preferred compounds are those in which $m$ and $n$ are integers of from 1 to 5. Examples of monohydric polyalkylene oxides having the above formula include methoxypolymethylene glycol, methoxypolyethylene glycol, ethoxypolyethylene glycol, propoxypolyethylene glycol, butoxypolyethylene glycol, phenoxypolyethylene glycol, methoxypolypropylene glycol, ethoxypolypropylene glycol, phenoxypolypropylene glycol, methoxypolybutylene glycol, ethoxypolybutylene glycol, and phenoxypolybutylene glycol. Those polyalkylvinyl ethers suitable for use as chain-terminating compounds in the present invention include the addition polymers having one terminal hydroxyl group prepared by the homopolymerization of alkylvinyl ethers wherein the alkyl group contains from one to four carbon atoms, such as polymethylvinyl ether, polyethylvinyl ether, polypropylvinyl ether, and polyisobutylvinyl ether.

In the preparation of polyethylene terephthalate, the method comprises two steps. In the first step, ethylene glycol and terephthalic acid or dimethyl terephthalate are reacted at elevated temperatures and atmospheric pressure to form water or methanol respectively, which is removed, and bis-2-hydroxyethyl terephthalate monomer. This step generally requires from 1 to 3 hours at temperatures of from 150° to 220° C. Thereafter, in the second step, the monomer is heated at still higher temperatures normally from about 260° to 290° C., and under reduced pressures to form the polyethylene terephthalate with the elimination of ethylene glycol, which is readily volatilized under these conditions and removed from the system. The second, or polymerization step, is continued until a fiber-forming polymer having the desired degree of polymerization is obtained. This polymerization, or vacuum finishing, step normally requires from about 1 to about 6 hours to develop a satisfactorily high degree of polymerization. Preferably this step is conducted in from 2 to 4 hours.

The degree of polymerization required to produce cold-drawable fibers can be determined by measuring the specific viscosity of the polymer. The fiber and filament-forming polyethylene terephthalates possess specific viscosities within the range of from about 0.30 to about 0.60. It is to be understood that non-fiber-forming modified polyesters can be produced by means of the present invention having specific viscosities without the stated range which have utility as film-forming, coating, and molding compositions.

Specific viscosity of the polyester, as referred to herein, refers to the relative viscosity minus one. Relative viscosity of the polyester is determined by measuring the viscosity in seconds of a 0.5 percent solution of the polyester and dividing by the viscosity in seconds of the solvent at the same temperature, i.e., usually 25° C. A suitable solvent for the polyethylene terephthalates is a mixture of two parts by weight phenol with one part by weight 2,4,6-trichlorophenol, the mixture containing 0.5 percent water.

The monohydroxyl compounds employed as chain-terminating compounds in the modification of polyethylene terephthalate polymers by this invention are used in amounts of from about 0.05 mole percent to about 1.0 mole percent based on the amount of terephthalic acid source present. The term "terephthalic acid source," as applied to this invention, embraces both the free acid and the dialkyl esters of terephthalic acid, such as dimethyl terephthalate, commonly employed in ester-interchange reactions with the polymethylene glycols. The modifying compounds are used in amounts of from about 0.05 mole percent to 1.0 mole percent, since when more than about 1.0 mole percent of the monohydroxyl compounds are used the physical properties of the resulting modified polyethylene terephthalate polymers are increasingly affected. The weight percent, based on the weight of the terephthalic acid source present, of the added chain-terminating compounds varies with the molecular weight of the polymeric monohydroxyl compounds themselves. The range of average molecular weights of the polymeric monohydroxyl compounds which can be employed in this invention is from 500 to 5000. The preferred range of average molecular weights is from about 1000 to 3500.

Inclusion of more than 1.0 mole percent of the monohydroxyl chain-terminating compounds in polyethylene terephthalate has resulted in such reductions in the average molecular weight of the polyester, as evidenced by reductions in specific viscosity, as to render the fibers produced therefrom weak and brittle. In other words, the specific viscosities of the resulting polyesters are below the practical fiber-forbing level of about 0.30. It has been found that increasing amounts of the monohydroxyl chain-terminating compounds tend to lower the specific viscosities and average molecular weights of the resulting modified polyesters, but amounts within the stated range of from 0.05 to 1.0 mole percent do not result in a specific voscosity below the practical fiber-forming range of 0.30 to 0.60. Amounts of more than 1.0 mole percent progressively accelerate the lowering of specific viscosity and average molecular weight. Furthermore, the inclusion of more than 1.0 mole percent of the chain-terminating compounds in the polyesters also results in a marked depression in the melting point of the resulting polymers. However, this effect has not been pronounced when additions of the modifying compounds have been within the range of from 0.05 to 1.0 mole percent.

The modification of polyethylene terephthalate according to the present invention may be carried out by incorporating the modifying chain-terminating compound in the ester-interchange reaction mixture, or in other words, before carrying out the first step in the preparation of polyethylene terephthalate. Likewise, the monohydroxyl compounds employed as the chain-terminating agents can be incorporated after carrying out the first, or ester-interchange, step of the preparation. This may be accomplished by simply charging the desired amount of the chain-terminating agent into the reaction after the end of the first step and before proceeding with the second step, which is generally conducted at a somewhat higher temperature and below atmospheric pressure.

Any catalyst which is suitable for use in the preparation of polyethylene terephthalate by a polyesterification or ester-interchange reaction is likewise suitable for the preparation of the new modified polyethylene terephthalates of this invention. Such catalysts include sulfonic acid catalysts, such as p-toluenesulfonic acid and camphorsulfonic acid, metallic salts of fatty acids, such as stannous formate, manganous formate, cobaltous acetate, zinc acetate, manganous acetate, zinc caproate, cadmium propionate, and zinc propionate, and metal salts of aliphatic dibasic acids such as zinc succinate, zinc adipate or zinc azelate.

Though it is understood that this invention is not limited by any theory of its action, it is believed that the desirable results obtained are the result of the use of monofunctional hydroxyl compounds as chain-terminating agents. Thus any tendency during the polymerization process for the polyethylene terephthalate being modified to become cross-linked or branched from the chain is avoided. The increase in dye receptivity sought is achieved without in any way affecting the interior of the polyester molecule, since all the modifying groups introduced into the polyethylene terephthalate polymer molecule can only function as chain-terminating or end groups. Hence the chain-terminating groups will represent a very small proportion of the total polymer molecule. Therefore, it is believed that the increased dyeability without depreciation of other desirable physical properties of the polymer is achieved. This result is borne out by the fact that the melting points of the modified polyethylene terephthalate polymers are depressed very slightly from the melting point of the unmodified polymer, and the specific viscosity is maintained within the fiber-forming range.

The following specific examples are offered to further illustrate the present invention, and it is not intended that the invention be limited to the specific amounts or proportions set forth therein.

*Example I*

There was charged to a reaction vessel 38.4 g. of dimethyl terephthalate, 49.0 g. of ethylene glycol, 3.04 g. of methoxypolyethylene glycol having an average molecular weight of about 1520 (1.0 mole percent based on the moles of dimethyl terephthalate), 20 mg. of manganous formate, and 10 mg. of antimony oxide. The reactants were well mixed and heated at 177° C. until solution was affected. The reactants were then maintained at this temperature for 90 minutes to effect the ester interchange reaction, thereafter raised to a temperature of 285° C. to remove excess ethylene glycol and maintained at that temperature under a vacuum of less than 1 mm. of mercury for three hours to effect polymerization. There was obtained a high molecular weight polymer melting at 254° C. in air and having a specific viscosity of 0.294. Fibers drawn from the melted polymer were susceptible to cold drawing. A sample of the polymer ground to pass a 40 mesh screen was dyed for three hours at 200° F. in a solution of a dispersed acetate dye, Eastman Blue GLT, containing four percent dyestuff based on the weight of polymer dyed, which resulted in a 79% exhaustion of the dyebath. A sample of unmodified polyethylene terephthalate polymer prepared, ground and dyed in the same manner resulted in a 61% exhaustion of the dyebath.

Example II

There was charged 38.5 g. of dimethyl terephthalate, 49.0 g. of ethylene glycol, 2.73 g. of methoxypolyethylene glycol having an average molecular weight of about 1520 (0.9 mole percent based on the moles of dimethyl terephthalate), 20 mg. of manganous formate and 10 mg. of antimony oxide. The ester-interchange reaction and the polymerization reaction were carried out in the same manner as set forth in Example I above, and there was obtained a high molecular weight polymer melting at 254° C. in air and having a specific viscosity of 0.312. Fibers drawn from the melted polymer were susceptible to cold drawing. A sample of the polymer ground to pass a 40 mesh screen was dyed in the same manner as described above in a solution of a dispersed acetate dye, Eastman Blue GLT, containing four percent dyestuff based on the weight of polymer dyed which resulted in a 77% exhaustion of the dyebath.

Example III

There was charged 38.5 of dimethyl terephthalate, 49.0 g. of ethylene glycol, 2.43 g. of methoxypolyethylene glycol having an average molecular weight of about 1520 (0.8 mole percent based on the moles of dimethyl terephthalate), 20 mg. of manganous formate and 10 mg. of antimony oxide. The ester-interchange reaction and the polymerization reaction were carried out in the same manner as set forth in Example I above, and there was obtained a high molecular weight polymer melting at 254° C. in air and having a specific viscosity of 0.335. Fibers drawn from the melted polymer were susceptible to cold drawing. A sample of the polymer ground to pass a 40 mesh screen was dyed in the same manner as described above in a solution of a dispersed acetate dye, Eastman Blue GLT, containing four percent dyestuff based on the weight of polymer dyed, which resulted in a 76% exhaustion of the dyebath.

Example IV

There was charged 38.5 g. of dimethylterephthalate, 49.0 g. of ethylene glycol 2.13 g. of methoxypolyethylene glycol having an average molecular weight of about 1520 (0.7 mole percent based on the moles of dimethyl terephthalate), 20 mg. of manganous formate, and 10 mg. of antimony oxide. The ester-interchange reaction and the polymerization reaction were carried out in the same manner as set out in Example I above, and there was obtained a high molecular weight polymer melting at 254° C. in air and having a specific viscosity of 0.595. Fibers drawn from the melted polymer were susceptible to cold drawing. A sample of the polymer ground to pass a 40 mesh screen was dyed in the same manner as described above in a solution of a dispersed acetate dye, Eastman Blue GLT, containing four percent dyestuff based on the weight of polymer dyed, which resulted in a 76% exhaustion of the dyebath.

Example V

There was charged 38.5 g. of dimethyl terephthalate, 49.0 g. of ethylene glycol, 0.8 g. of polymethylvinyl ether having one terminal hydroxy group and an average molecular weight of about 800 (0.05 mole percent based on the moles of dimethyl terephthalate), and 20 mg. of manganous formate. The ester-interchange reaction and the polymerization reaction were carried out in the same manner as set forth in Example I above, and there was obtained a high molecular weight polymer. Fibers drawn from the melted polymer were susceptible to cold drawing. A sample of the polymer ground to pass a 40 mesh screen was dyed in the same manner as described above in a solution of a dispersed acetate dye, Eastman Blue GLT, containing four percent dyestuff based on the weight of the polymer dyed, which resulted in a 71% exhaustion of the dyebath.

Example VI

There was charged 82.0 g. of dimethyl terephthalate, 98.0 g. of ethylene glycol, 8.2 g. of ethoxypolyethylene glycol having an average molecular weight of about 3050 (0.64 mole percent based on the moles of dimethyl terephthalate), and 20 mg. of manganous formate. The ester-interchange reaction and the polymerization reaction were carried out in the same manner set forth in Example I above. A high molecular weight polymer having a specific viscosity of 0.381 was obtained, and fibers were drawn from the melted polymer. The fibers thus drawn were of an average denier of 34.2 and possessed an average tenacity 3.89 mg. per denier and a moisture regain of 0.70%. Such fibers were readily dyeable at 200° F. in a dyebath containing 4% of a dispersed acetate dye, Eastman Blue GLT, to a medium to dark shade with good uniformity. A sample of scoured unmodified polyethylene terephthalate staple dyed in the same manner dyed only to a very light blue with poor uniformity.

This invention is particularly suitable for modification of the high molecular weight fiber-forming polyethylene terephthalates formed by condensation of terephthalic acid and a polymethylene glycol containing from 2 to 10 carbon atoms, and more particularly to modification of polyethylene terephthalate. However, copolymers prepared by substituting other dicarboxylic acids for part of the terephthalic acid, or by using more than one of the polymethylene glycols containing from 2 to 10 carbon atoms in the polymerization may also be modified in the manner of this invention.

The modified polyethylene terephthalate polymers of this invention are more readily dyeable by commercial techniques than is the unmodified polyethylene terephthalate. They are particularly readily dyed with that class of dyestuffs known to the trade as the dispersed acetate type dyes. Examples of dyestuffs which can be used to dye the modified polyethylene terephthalate polymers are: Acetamine Orange GR Conc. 175% (Pr. 43), Celanthrene Fast Yellow GL Conc. 300% (Pr. 534), Celanthrene Brilliant Blue FFS Conc. 200% (Pr. 228), and Celanthrene Fast Pink 3 B (Pr. 235).

The process of this invention affords a new and useful method of increasing the dye affinity of polyethylene terephthalate polymers, particularly for the dispersed acetate type dyestuffs. The resulting modified polyesters have not suffered the loss of their desirable characteristics and, in addition, can be readily dyed with the dispersed acetate dyestuffs by standard commercial techniques.

Since many different embodiments of the invention may be made without departing from the spirit and scope thereof, it is to be understood that the invention is not limited by the specific examples except to the extent defined in the appended claims.

I claim:

1. A process for preparing fiber-forming dye-receptive modified polyethylene terephthalate containing chain-terminating groups which comprises mixing together at least one compound selected from the group consisting of terephthalic acid and dimethyl terephthalate, and ethylene glycol, with from 0.05 to 1.0 mole percent, based on the weight of the first-named compound, of a monohydric polymeric hydroxyl compound selected from the group consisting of monohydric polyalkylene oxides having the formula:

$$R-O[(CH_2)_mO]_x(CH_2)_n-OH$$

wherein R is selected from the group consisting of alkyl groups containing from 1 to 4 carbon atoms and aryl groups containing from 6 to 10 carbon atoms, $m$ and $n$ are integers from 1 to 4, and $x$ is an integer in the range of 1 to 100, and polyalkylvinyl ethers with one terminal hydroxyl group in which the alkyl group contains from 1 to 4 carbon atoms and having a molecular weight of from 500 to 5000, reacting said mixture by heating to a temperature in the range of 150° to 290° C. in the presence of a suitable catalyst, and continuing the heating and reaction of said mixture until a fiber-forming modified polyethylene terephthalate is produced.

2. A process for preparing fiber-forming dye-receptive modified polyethylene terephthalate containing chain-terminating groups which comprises mixing together at least one compound selected from the group consisting of terephthalic acid and dimethyl terephthalate, and ethylene glycol, with from 0.05 to 1.0 mole percent, based on the weight of the first-named compound, of a monohydric polymeric compound selected from the group consisting of monohydric polyalkylene oxides having the formula:

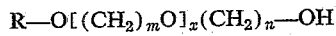

$$R-O[(CH_2)_mO]_x(CH_2)_n-OH$$

wherein R is selected from the group consisting of alkyl groups containing from 1 to 4 carbon atoms and aryl groups containing from 6 to 10 carbon atoms, $m$ and $n$ are integers from 1 to 4, and $x$ is an integer in the range of 1 to 100, and polyalkylvinyl ethers with one terminal hydroxyl group in which the alkyl group contains from 1 to 4 carbon atoms and having a molecular weight of from 500 to 5000, reacting said mixture by heating to a temperature in the range of 150° to 290° C. in the presence of a suitable catalyst, and continuing the heating and reaction of said mixture until a fiber-forming modified polyethylene terephthalate is produced possessing the property of cold-drawing.

3. The process as defined in claim 1 wherein the monohydric polymeric hydroxyl compound is methoxypolyethylene glycol.

4. The process as defined in claim 1 wherein the monohydric polymeric hydroxyl compound is ethoxypolyethylene glycol.

5. The process as defined in claim 1 wherein the monohydric polymeric hydroxyl compound is propoxypolyethylene glycol.

6. The process as defined in claim 1 wherein the monohydric polymeric hydroxyl compound is phenoxypolyethylene glycol.

7. The process as defined in claim 1 wherein the monohydric polymeric hydroxyl compound is polymethylvinyl ether.

8. Modified polyethylene terephthalate prepared by the process of claim 1.

9. Modified polyethylene terephthalate prepared by the process of claim 1 and having a specific viscosity in the range of 0.30 to 0.60.

10. Cold-drawable dye-receptive modified polyethylene terephthalate filaments made from the modified polyethylene terephthalate prepared by the process of claim 1.

References Cited in the file of this patent

UNITED STATES PATENTS 2,744,087   Snyder _____ May 1, 1956

FOREIGN PATENTS 133,258   Australia _____ June 21, 1949

OTHER REFERENCES

Coleman: J. Polymer Sci. XIV, 15–28 (1954). (Copy in Scientific Library.)